NONLINEAR ELECTRICAL ARRANGEMENT

Filed July 5, 1960

2 Sheets-Sheet 1

INVENTOR.
FREDERICK W. SCHMIDLIN
BY Gerald Singer
AGENT
Albert Rosen
ATTORNEY

*INVENTOR.*
FREDERICK W. SCHMIDLIN
*BY* Gerald Singer
AGENT
Albert Rosen
ATTORNEY 3,024,140

NONLINEAR ELECTRICAL ARRANGEMENT

Frederick W. Schmidlin, Redondo Beach, Calif., assignor to Space Technology Laboratories, Inc., Los Angeles, Calif., a corporation of Delaware Filed July 5, 1960, Ser. No. 40,893
17 Claims. (Cl. 148—1.5)

This invention relates generally to nonlinear electrical apparatus exhibiting the characteristic of negative resistance, and more specifically to a structure in which what is known as electron "tunneling" is effected through a thin dielectric material located intermediate selected conductive materials.

"Tunneling" is the name used to describe the phenomenon wherein an electron at a given energy level, and located on one side of a potential energy barrier, is capable of appearing on the other side of the barrier at the same energy level. It is generally believed that before a device can exhibit the tunneling effect, three basic conditions must be present: first, there must be a finite tunneling probality, that is, the energy barrier should be sufficiently thin to enable tunneling of the electron to be effected; second, an allowed energy level for an electron on one side of the barrier should be occupied, that is, an energy level capable of defining a source of electrons; and, third, there should be an allowed energy level on the other side of the barrier that is empty, which means the electron should have a place to go.

One such negative resistance device has been described by L. Esaki (now known as a tunnel diode) in an article entitled "New Phenomenon in Narrow Germanium p-n Junctions," published in The Physical Review, vol. 109, p. 603, 1958. It was pointed out that by heavily doping germanium, a p-n junction could be formed that would exhibit negative resistance characteristics with the application of a small forward bias voltage. Unfortunately, however, manufacturing limitations incurred in the mass production of the tunnel diode have limited the useful applications of this potentially important device. One of the more important problems appears to be concerned with the control of the degree of doping of both the p-type and n-type materials. It has been determined that the degree of doping critically affects the voltage-current characteristics of the diode. In view of the wide variations of the doping process, it is necessary to test each device to determine its individual characteristics, and then discard those devices that deviate from a given norm. At the present a relatively large fraction of each manufacturing run of tunnel diodes is discarded as unacceptable due to improper doping of the materials.

In the present invention the problem is avoided by using a thin film having a controlled thickness for limiting the tunneling probability. In one embodiment this film is placed intermediate a very heavily doped n-type material and a very heavily doped p-type material. The techniques for constructing one such thin film are disclosed, for example, in a co-pending application entitled "Method and Apparatus for the Deposition of Thin Films by Electron Deposition," by Robert W. Christy, filed March 31, 1960, Serial No. 19,022, and assigned to the same assignee as the present application. By utilizing the techniques taught in this patent application it is possible to produce a thin film having a thickness up to 300 angstroms thick and in a reliable and repetitive fashion. By using a thin film dielectric, it is now permissible to heavily dope both the n-type and p-type materials without specific regard to the degree of doping as long as both the p and n type carriers have a concentration at least of the order of $10^{20}$ carriers per cubic centimeter, since the finite thickness of the thin film barrier will prevent breakdown. The heavily doped n-type material will supply the necessary electrons at a given energy level and the heavily doped p-type material will supply the necessary available energy levels for the electrons that are to tunnel through the barrier.

In a second embodiment there is shown another electrical device exhibiting the characteristic of negative resistance. In this second embodiment the specific materials are bonded on each side of a thin dielectric film. The materials are chosen from a group having a conduction band intermediate a full energy band and an empty energy band. The defined conduction band should be separated from the empty band by a first forbidden energy band and from the full energy band by a second forbidden energy band. It is further required that each of these energy bands have an energy gap that is substantially wider than the width of the defined conduction energy band. The materials may be the same or may be different provided, however, that they stay within the limits as defined. Certain materials having these characteristics are titanium monoxide (TiO), titanium sesquioxide ($Ti_2O_3$), and vanadium sesquioxide ($V_2O_3$). The materials having the desired characteristics are found in the group generally identified as the transition materials. In devices of this type it will be immediately appreciated that doping of the materials is not necessary. As will be explained later, this device also exhibits the negative resistance characteristic in the presence of a small forward biasing voltage. Reproducibility with respect to doping is no longer a problem, since doping of the material has been eliminated.

Further advantages of this invention will become apparent by referring now to the accompanying drawings wherein.

By way of explanation, it should be mentioned that the doping of n-type material supplies the necessary excess doner electrons, whereas the doping of p-type material supplies the necessary excess electron acceptor holes. This excess of electrons and holes is necessary in the tunnel diode to generate the proper barrier conditions where the materials contact. Upon contact, an equilibrium condition is achieved in which the Fermi level in the n-type material is made to occur at the same energy level as the Fermi level in the p-type material. This equilibrium process results in the p-type material having a more negative over-all charge than the n-type material. The generated barrier is a result of these moved charges and is sometimes called a charge depletion layer. Controlled doping of the p-type and n-type material should control the thickness of the depletion layer. This is necessary to maintain a consistent tunneling probability. It is known, however, that if excessive doping takes place the barrier will be too thin, and a breakdown will occur. Conversely, if insufficient doping takes place, the barrier will be too thick and the tunneling probability will be too low to ensure operation.

Figure 1:
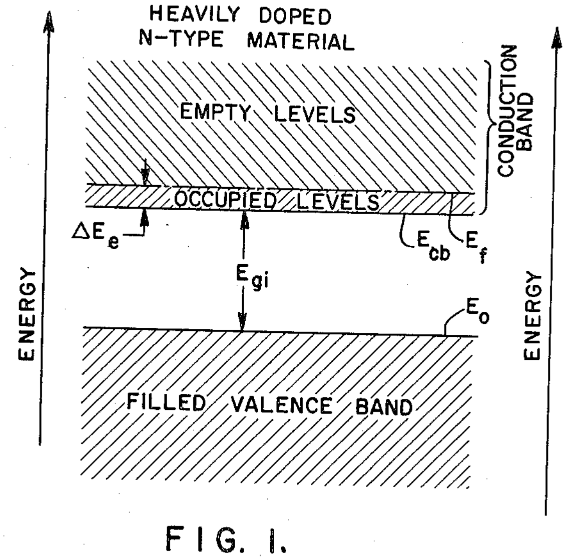
FIG. 1 is an energy diagram representing the energy levels existing in a heavily doped n-type material.

Referring now to FIG. 1, there is shown an energy diagram of a heavily doped n-type material. The doping is considered so great that the familiar localized levels more common in semiconductor materials have coalesced into a band which has also blended with the conventional conduction band. The energy level at the top of the uppermost normally filled band, sometimes called the valence band, is label $E_0$. Above the valence band there is a forbidden band of width $E_{g1}$. The energy level at the top of the forbidden band is coincident with the bottom of the conduction band labeled $E_{cb}$. The Fermi level, which defines the boundary between the occupied and unoccupied levels near absolute zero in temperature, is labeled $E_f$. The distance $\Delta E_e$ between the lowest level of the conduction band ($E_{cb}$) and the Fermi level ($E_f$) represents those levels in the conduction band occupied by electrons. FIG. 1 is fairly representative of the energy level distribution in any heavily doped n-type material.

Figure 2:
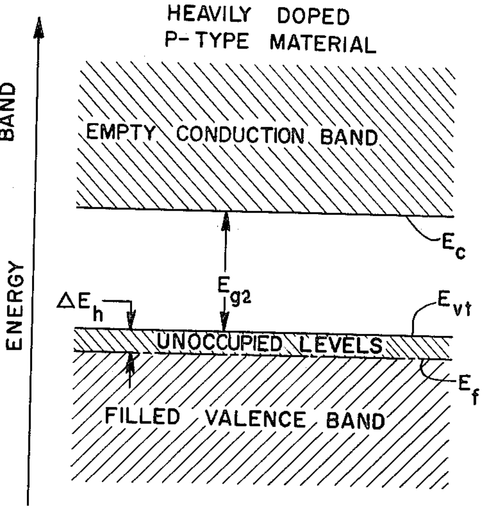
FIG. 2 is an energy diagram representing the energy levels existing in a heavily doped p-type material.

Referring now to FIG. 2, there is depicted a heavily doped p-type material in which the energy at the bottom of the uppermost conduction band is labeled $E_c$, and the bottom of the forbidden band which coincides with the top of the valence band is labeled $E_{vt}$. Here, again, the doping is so great that the localized hole levels have formed a band which blends into the valence band. The Fermi level is indicated as $E_f$. The forbidden energy band is labeled $E_{g2}$ and is also identified as the difference between levels $E_c$ and $E_{vt}$. The energy distance $\Delta E_h$ between the top of the valence band and the Fermi level is the difference between $E_{vt}$ and $E_f$ and represents the unoccupied electron levels commonly referred to as holes.

Figure 3:
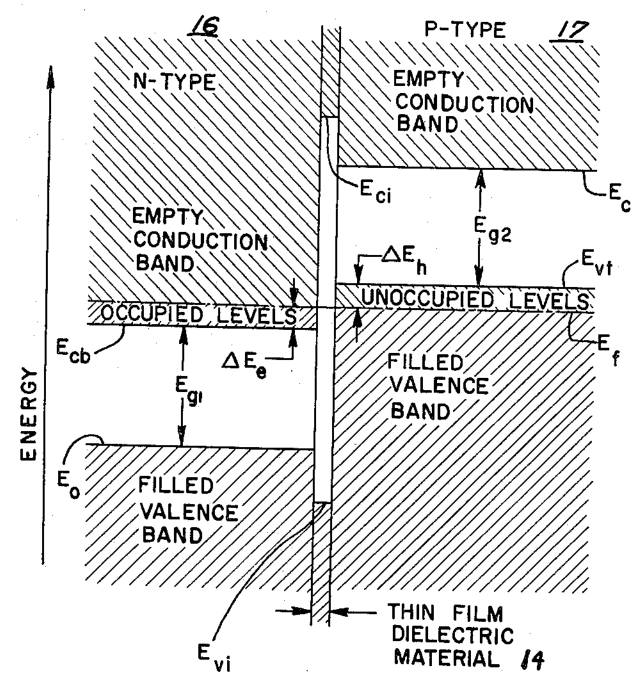
FIG. 3 is an energy diagram representing the relative energy levels existing in a device in which a heavily doped n-type material is bonded to one side of a thin dielectric material and a heavily doped p-type material is bonded to the other side of the thin dielectric material.

FIG. 3 illustrates an energy diagram for a device that uses a thin dielectric material 14 having a heavily doped n-type material 16 (as illustrated in FIG. 1) bonded on one side, and a heavily doped p-type material 17 (as illustrated in FIG. 2) bonded on the other side. In this case the doping is even greater than in the conventional tunnel diode, resulting in a charge depletion layer that is negligible in thickness as compared to the thickness of the insulating film. FIG. 3 also depicts the relative energy distribution between the p-type material and the n-type material. The displaced energy levels of the p-type and n-type materials are due to the fact that all substances in contact with each other, and in thermal equilibrium, will produce an electron flow sufficient to cause an alignment of the Fermi levels of the materials 16 and 17. The movement of electrons in heavily doped materials would generally cause a depletion layer of significant thickness but due to the extremely heavy doping, this depletion layer has here become vanishingly thin. In other words, greater impurity concentration implies greater carrier concentration, which in turn causes a thinner charge depletion layer. The only energy levels within the thin dielectric 14 which are illustrated in FIG. 3 are at the top of the valence band, $E_{vi}$, and at the bottom of the conduction band, $E_{ci}$. The Fermi level lies in the forbidden band of the insulator midway between $E_{vi}$ and $E_{ci}$. The only requirement on the band structure of the insulator dielectric material 14 is that the forbidden gap be much wider than $\Delta E_e+\Delta E_h$, which is normally assured for most good insulators. The thickness of the dielectric, in order to have finite tunneling probability, should be of the order of 100 angstroms in thickness. The polymerized silicone film referred to (discussed in the co-pending patent application referred to) is an ideal thin dielectric film for the present apparatus.

Such a polymerized in situ dielectric or insulating film may, for example, be made by subjecting either of the p or n types of materials 16 or 17 to a dielectric film coating. The material to be covered is subjected to electron bombardment in an environment of a silicone oil vapor, the electron beam creating a solid polymer film on the element.

Figure 4:
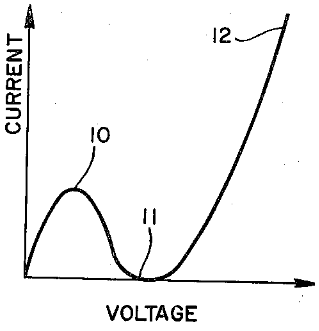
FIG. 4 is a graph illustrating the characteristics of the device illustrated in FIG. 3. This graph shows the negative resistance characteristics of the device in the presence of a small forward biasing voltage.

In the operation of the device of FIG. 3, a small positive voltage applied to the p-type material 17 with respect to the n-type material 16 will result in a volt ampere characteristic as illustrated in FIG. 4. The negative resistance region, as evidenced by the decrease in current with an increase in voltage, will occur only if the following conditions are satisfied:

$$\Delta E_h < E_{g1} = E_{cb} - E_0 \quad (1)$$

$$\Delta E_e < E_{g2} = E_c - E_{vt} \quad (2)$$

A qualitative explanation of the negative resistance characteristic will now be discussed in order to explain more fully the phenomenon with which the invention is concerned. A small positive voltage applied to p-type material 17, with respect to the n-type material 16, will shift the entire energy level distribution of the p-type material downward with respect to the energy level distribution of the n-type material. The Fermi level in the dielectric material 14 or insulator becomes tilted so that it matches the Fermi levels of the two electrode materials 16 and 17. Now, occupied levels in the n-type material occur directly across (i.e., at the same energy) from unoccupied levels in the p-type material, separated only by a narrow energy barrier. Conditions are now satisfied for electron tunneling to occur. As the applied voltage is increased, more and more occupied levels appear across from unoccupied levels, and the current continues to increase. However, at a sufficiently high voltage, occupied levels in the n-type material begin to appear across from forbidden levels in the p-type material and the current begins to decrease, as indicated at numeral 10 in the graph of FIG. 4. Upon further increase of voltage more of the occupied levels appear across from forbidden levels until essentially all the occupied levels represented by $\Delta E_e$ appear across from the forbidden gap $E_{g2}$( at which point the current is reduced to a minimum as indicated at numeral 11 in FIG. 4. At the minimum current 11, the empty $\Delta E_h$ band (FIG. 3) is opposite the forbidden energy band identified as $E_{g1}$. This is important to prevent holes from tunneling into the filled valence band of the n-type material. A continued increase of voltage will not produce any current until the occupied band again opposes the empty conduction band or the unoccupied levels in the p-type material oppose the filled valence band of the n-type material. At this point tunneling resumes, and the current increases again as indicated by the portion of the volt-ampere characteristic curve labeled 12 in FIG. 4.

Figure 5:
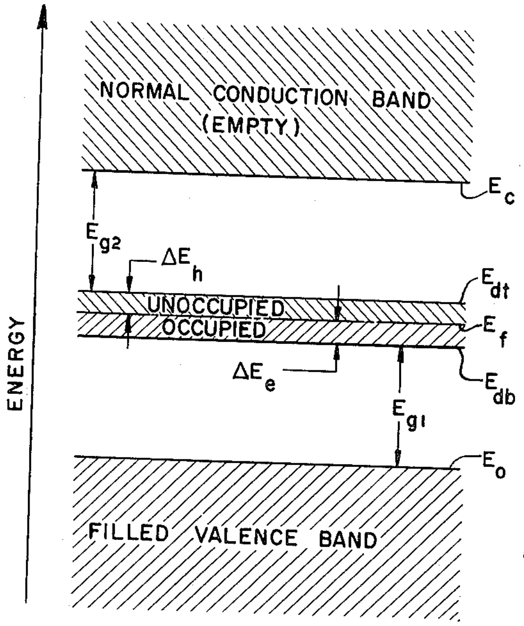
FIG. 5 is an energy diagram representing the relative energy level distribution of a material used in the second embodiment of this invention.

Referring now to FIG. 5, there is shown an energy level diagram of a material having the necessary characteristics for use in the second embodiment of this invention. The particular material chosen is one of the transition metal oxides in which conduction occurs in the 3*d* band indicated as region $E_{dt}$—$E_{db}$. The 3*d* band is located intermediate a filled valence band and the normal conduction band (which is empty). A forbidden energy band, identified as $E_{g1}$, separates the 3*d* band from the filled valence band and is substantially wider than the 3*d* band. Similarly, a forbidden energy band, identified as $E_{g2}$, separates the empty conduction band from the 3*d* band and is substantially wider than the 3*d* band. The 3*d* band is only partly full, and will therefore now support conduction. The Fermi level $E_f$ lies somewhere intermediate the $E_{dt}$ and $E_{db}$ levels as indicated, and essentially separates the occupied and unoccupied levels in the 3*d* band, which are labeled $\Delta E_e$ and $\Delta E_h$, respectively.

Figure 7:
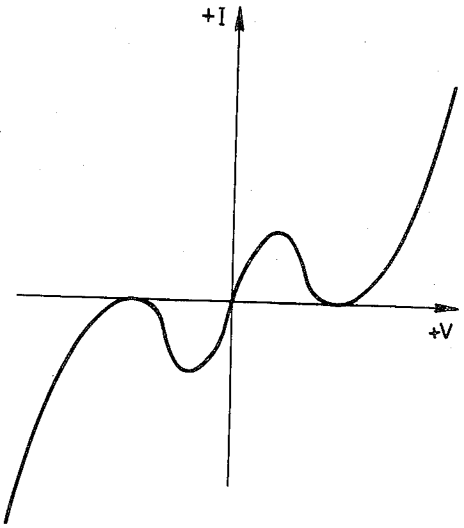
FIG. 7 illustrates the symmetrical characteristics of the device illustrated in FIG. 6.
Figure 6:
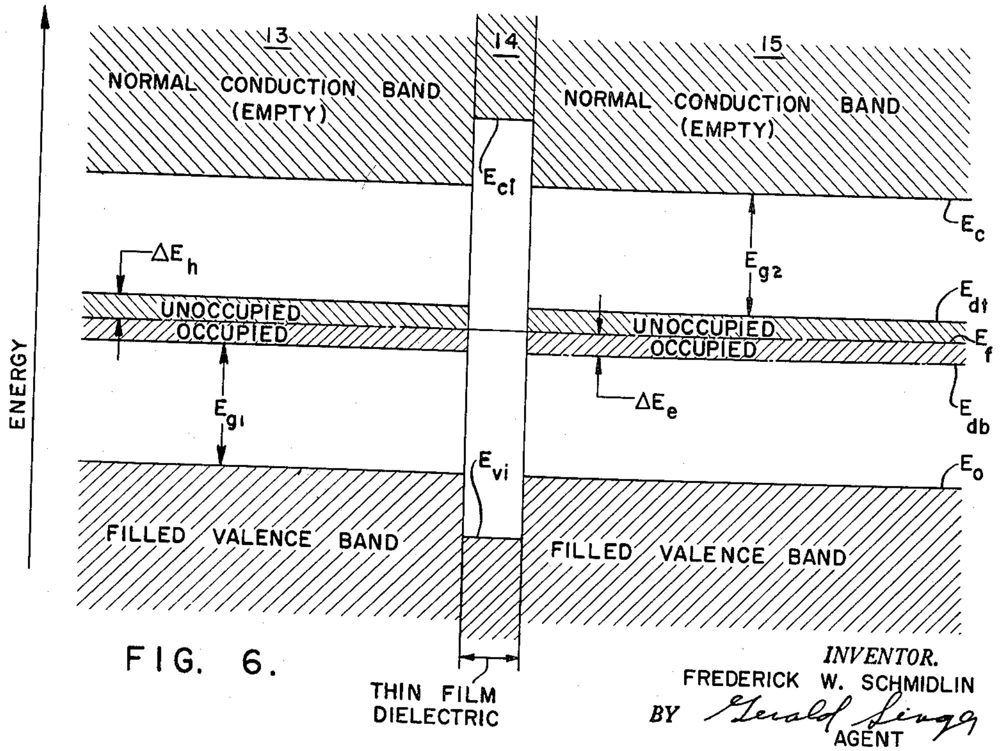
FIG. 6 is an energy diagram of a device making use of the phenomenon illustrated in FIG. 5. The device represented in FIG. 6 is a structure wherein identical materials are bonded on each side of a thin dielectric film.

Referring now to FIG. 6, there is shown an energy diagram of a first member of material 13 having the characteristics as set forth in connection with FIG. 5 bonded to one side of a thin dielectric film or material 14 and another member of a similar type material 15 (even an identical material) bonded to the opposite side of the dielectric material. It will be appreciated that the conditions as set forth by Equations 1 and 2 are satisfied and that the defined structure will exhibit the phenomenon of negative resistance as illustrated in FIG. 7. FIG. 6 illustrates an arrangement where identical materials 13 and 15 are bonded on either side of the thin film dielectric material 14. With this configuration, it is to be expected that the current voltage curve will be symmetrical, as indicated in FIG. 7. Materials that are not identical but still within the metes and bounds as defined by Equations 1 and 2 may still be used; however, their current voltage curves will not be symmetrical. As indicated previously, among the materials that exhibit the desired energy band characteristics are titanium monoxide (TiO), titanium sesquioxide ($Ti_2O_3$), and vanadium sesquioxide ($V_2O_3$). According to present day knowledge, it would appear that only materials containing the transition metals exhibit the desired energy band structures that are needed for the disclosed device. A more complete analysis of the compounds containing the transition metals suitable for use in the second embodiment of this invention is given in a book entitled "Semiconductors," edited by N. B. Hanney, published by Reinhold Publishing Corp., in 1959, and specifically Chapter 14 by F. J. Morin.

Figure 8:
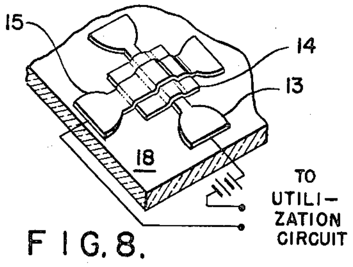
FIG. 8 is a pictorial illustration of a vacuum deposited tunnel diode according to the invention as embodied in a structure suitable for low cost mass production.

Referring now to FIG. 8, there is shown a pictorial illustration of a vacuum deposited tunnel diode. Of particular importance in the practice of this invention is the ease of fabricating the tunnel diode as disclosed in this invention. For example, both embodiments (FIG. 3 and FIG. 6) lend themselves to being produced by means of well-known vacuum deposition techniques. A suitable technique is discussed in a patent application entitled "Vacuum Deposition Arrangement," by John N. Cooper and Eugene C. Crittenden, Jr., filed December 31, 1959, Serial No. 863,138, and assigned to the same assignee as the present invention. The semi-conducting materials disclosed in the first embodiment of this invention may be vacuum deposited according to techniques disclosed in Patent No, 2,938,816, entitled "Vaporization Method of Producing Thin Layers of Semiconducting Compounds." The particular materials disclosed in connection with the second embodiment of the present invention are transition metal oxides. Since these metals are in reduced form, the degree of oxidation may be controlled by either evaporating the metal in a controlled oxygen atmosphere or evaporating the metal oxide in a controlled reducing environment and in which reduction may be effected by an impinging electron beam. The two materials 13 and 15 (FIG. 8) are separated and insulated from each other by means of the film 14. As has been indicated above, the film 14 may be a polymerized insulating film of the order of 100 Angstrom units in thickness and made by subjecting the material to be covered with insulation (material 13) to electron bombardment in an environment of silicone oil vapor. The impinging electron beam will therefore create a solid polymer film on the material 13. In actual practice the lower material 13 will first be deposited on a suitable substrate, the insulating film 14 will then be formed on the material 13, and the overlying material 15 will then be deposited on the thin film 14 and substrate.

From the foregoing, it can be appreciated that a new and novel nonlinear electrical device has been disclosed.

What is claimed is:

1. An electrical apparatus comprising, a thin dielectric film, a first member bonded to one side of said film, and a second member bonded to the other side of said film, said first member being of a material having a band of occupied energy levels intermediate a band of unoccupied energy levels and a forbidden band of energy levels, said second member being of a material having a band of unoccupied energy levels intermediate a band of occupied energy levels and a forbidden band of energy levels, the forbidden band of said first member being substantially wider than the band of unoccupied energy levels of said second member, and the forbidden band of said second member being substantially wider than said band of occupied energy levels of said first member.

2. An electrical apparatus comprising: a thin dielectric film, a first material bonded to one side of said film, and a second material bonded to the other side of said film, each of said materials having a conduction band intermediate a full energy band and an empty energy band, each of said conduction bands being separated from its associated empty band by a first forbidden energy band and from its associated full energy band by a second forbidden energy band, each of said forbidden bands having an energy gap that is substantially wider than the width of its associated conduction band.

3. An electrical apparatus according to claim 2 wherein said dielectric material is up to of the order of 300 angstroms in thickness, for improved electron tunneling.

4. An electrical apparatus according to claim 2 wherein said first material is vanadium sesquioxide.

5. An electrical apparatus according to claim 2 in which said first material is titanium sesquioxide.

6. An electrical apparatus according to claim 4 in which said second material is titanium sesquioxide.

7. An electrical apparatus according to claim 2 wherein said first material and said second material are substantially the same.

8. An electrical apparatus comprising a thin dielectric material of the order of up to 300 Angstrom units in thickness, a first layer of vanadium sesquioxide bonded to one side of said dielectric material, and a second layer of vanadium sesquioxide bonded to the other side of said dielectric material.

9. An electrical apparatus comprising a first body of semiconductive material having a given conductivity type, said first body being heavily doped, a separate thin dielectric member of up to of the order of 300 Angstrom units in thickness, said first body being bonded to one side of said dielectric member, and a second body of semiconductive material having a conductivity type opposite that of said first body, said second body being heavily doped, said second body being bonded to the opposite side of said dielectric member.

10. An electrical apparatus according to claim 9 wherein said first body exhibits a p-type of conductivity.

11. In combination, an insulating substrate, a first material vapor deposited on said substrate, an insulating film deposited on said first material, and a second material vapor deposited on said insulating film, said first and second materials having a substantial number of current carriers sufficient to effect controlled tunneling through said film.

12. A thin insulating film sandwiched between a pair of conductor elements, the thickness of said film and the current carriers present in said elements being sufficient to effect controlled electron tunneling through said film.

13. In combination, a thin dielectric film, a first member bonded to one side of said film, and a second member bonded to the other side of said film, said first member and said second member having a substantially high number of current carriers, said thin film having a thickness sufficient to allow controlled electron tunneling by said current carriers through said film.

14. The method of making a tunnel diode using a first and second member having a band of unoccupied energy levels intermediate a band of occupied energy levels and a forbidden band of energy levels, the forbidden band of said first member being substantially wider than the band of unoccupied energy levels of said second member, and the forbidden band of said second member being substantially wider than said band of occupied energy levels of said first member, comprising the steps of depositing a layer of said first member on an insulating substrate, then depositing a thin dielectric insulating film on said material, and then depositing a layer of said second member on said thin dielectric insulating film.

15. The method according to claim 14 in which the dielectric insulating film is deposited as a polymerized film having a thickness of the order of 100 Angstrom units.

16. The method according to claim 14 in which both the first member and the second member are vacuum deposited.

17. Method of making a tunnel diode comprising the steps of: depositing a layer of titanium monoxide on a suitable substrate, then depositing a thin film of dielectric insulating material on said titanium monoxide, and then depositing a layer of titanium monoxide on said thin film.

References Cited in the file of this patent

UNITED STATES PATENTS

| | | |
|---|---|---|
| 2,651,009 | Meyer | Sept. 1, 1953 |
| 2,764,642 | Shockley | Sept. 25, 1956 |